(12) United States Patent
Jordan

(10) Patent No.: US 6,591,542 B1
(45) Date of Patent: Jul. 15, 2003

(54) BODY SUPPORT HARNESS FOR A FISHING ROD

(76) Inventor: Gary Jordan, P.O. Box 2638, Hartford, CT (US) 06146

( * ) Notice: Subject to any disclaimer, the term of this patent is extended or adjusted under 35 U.S.C. 154(b) by 0 days.

(21) Appl. No.: 10/045,886

(22) Filed: Oct. 19, 2001

(51) Int. Cl.[7] .............................................. A01K 97/10
(52) U.S. Cl. ...................................... 43/21.2; 224/922
(58) Field of Search .......................... 43/21.2; 224/922, 224/200

(56) References Cited

U.S. PATENT DOCUMENTS

| | | | | |
|---|---|---|---|---|
| 1,985,985 | A | * | 1/1935 | Gerline ....................... 43/21.2 |
| 2,271,136 | A | * | 1/1942 | Geiger ....................... 224/200 |
| 2,576,624 | A | * | 11/1951 | Miller ........................ 43/21.2 |
| 3,208,653 | A | | 9/1965 | Wallace |
| 3,282,482 | A | | 11/1966 | Scharsu |
| 4,103,807 | A | | 8/1978 | Lyon et al. |
| D291,503 | S | | 8/1987 | Hayes |
| 4,817,323 | A | | 4/1989 | Braid |
| 4,828,152 | A | | 5/1989 | Pepping |
| 5,738,257 | A | * | 4/1998 | McConnell .................. 43/21.2 |
| 5,855,086 | A | * | 1/1999 | Pandeles ..................... 43/21.2 |
| 5,956,883 | A | * | 9/1999 | Krouth et al. ............... 43/21.2 |
| 6,237,821 | B1 | * | 5/2001 | Owen .......................... 43/21.2 |
| 6,269,990 | B1 | * | 8/2001 | Gray ........................... 43/21.2 |

FOREIGN PATENT DOCUMENTS

GB      2 123 675 A      * 2/1984      .................. 43/21.2

* cited by examiner

*Primary Examiner*—Peter M. Poon
*Assistant Examiner*—Joan M. Olszewski

(57) ABSTRACT

A body support harness for a fishing rod for supporting an end tip of a fishing rod on a thigh of a wearer. The body support harness for a fishing rod includes a base member for positioning adjacent to a thigh of a wearer, a first mounting strap for mounting the base member to the thigh of the wearer, and a rod holder for receiving the end of a fishing rod. The base member has a front surface and a rear surface for positioning against the thigh of the wearer. The first mounting strap extends from the base member. The first mounting strap is designed to releasably encircle the thigh of the wearer. The rod holder receives the end of the fishing rod. The rod holder is pivotally mounted to the base member for adjusting an angle between the fishing rod received in the rod holder and the base member.

1 Claim, 2 Drawing Sheets

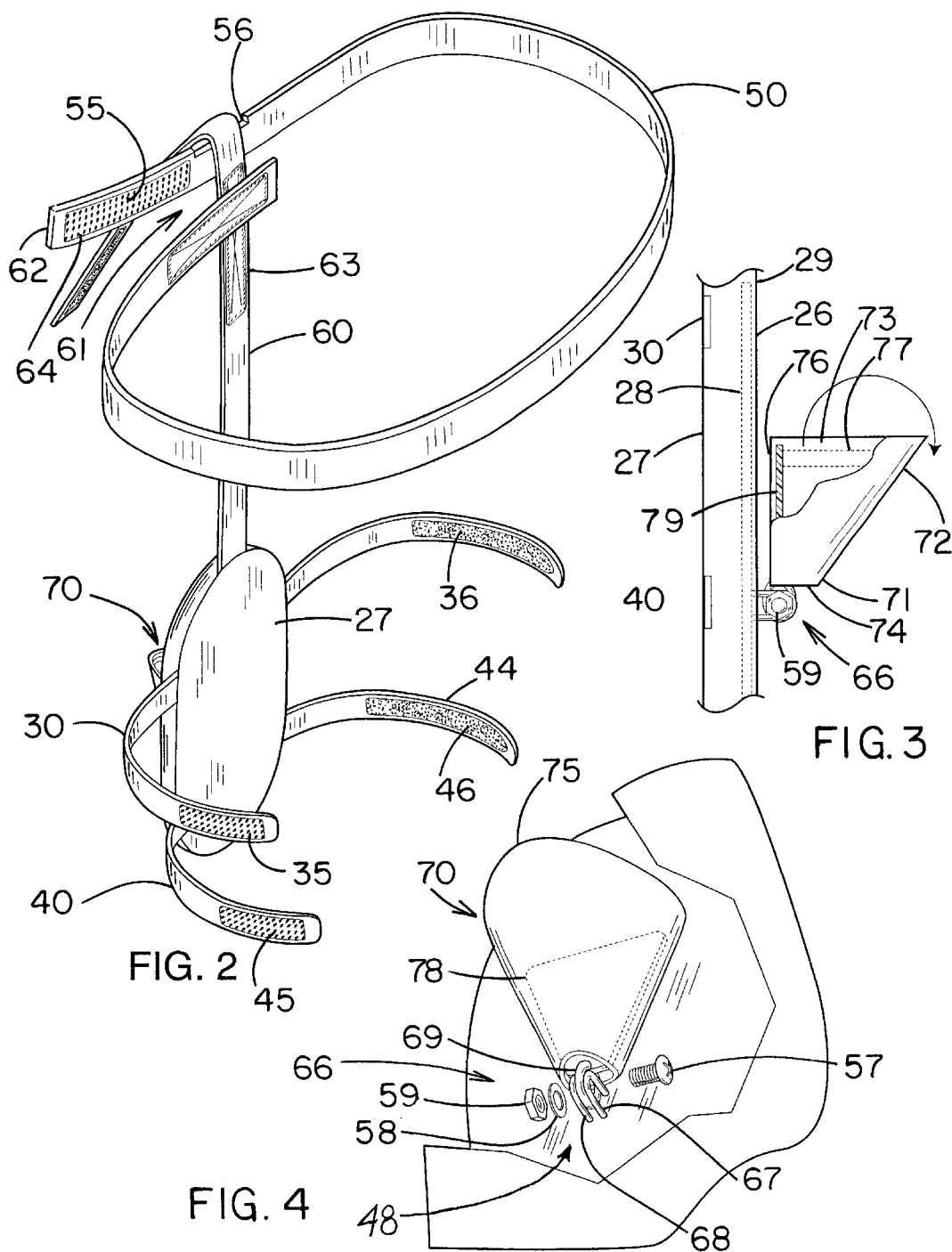

BODY SUPPORT HARNESS FOR A FISHING ROD

BACKGROUND OF THE INVENTION

1. Field of the Invention

The present invention relates to fishing rod devices and more particularly pertains to a new body support harness for a fishing rod for supporting an end tip of a fishing rod on a thigh of a wearer.

2. Description of the Prior Art

The use of fishing rod devices is known in the prior art. More specifically, fishing rod devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,817,323; U.S. Pat. No. 4,828,152; U.S. Pat. No. Des. 291,503; U.S. Pat. No. 4,103,807; U.S. Pat. No. 3,282,482; and U.S. Pat. No. 3,208,653.

While these devices fulfill their respective, particular objectives and requirements, the aforementioned patents do not disclose a new body support harness for a fishing rod. The inventive device includes a base member for positioning adjacent to a thigh of a wearer, a first mounting strap for mounting the base member to the thigh of the wearer, and a rod holder for receiving the end of a fishing rod. The base member has a front surface and a rear surface for positioning against the thigh of the wearer. The first mounting strap extends from the base member. The first mounting strap is designed to releasably encircle the thigh of the wearer. The rod holder receives the end of the fishing rod. The rod holder is pivotally mounted to the base member for adjusting an angle between the fishing rod received in the rod holder and the base member.

In these respects, the body support harness for a fishing rod according to the present invention substantially departs from the conventional concepts and designs of the prior art, and in so doing provides an apparatus primarily developed for the purpose of supporting an end tip of a fishing rod on a thigh of a wearer.

SUMMARY OF THE INVENTION

In view of the foregoing disadvantages inherent in the known types of fishing rod devices now present in the prior art, the present invention provides a new body support harness for a fishing rod construction wherein the same can be utilized for supporting an end tip of a fishing rod on a thigh of a wearer.

The general purpose of the present invention, which will be described subsequently in greater detail, is to provide a new body support harness for a fishing rod apparatus which has many of the advantages of the fishing rod devices mentioned heretofore and many novel features that result in a new body support harness for a fishing rod, which is not anticipated, rendered obvious, suggested, or even implied by any of the prior art fishing rod devices, either alone or in any combination thereof.

To attain this, the present invention generally comprises a base member for positioning adjacent to a thigh of a wearer, a first mounting strap for mounting the base member to the thigh of the wearer, and a rod holder for receiving the end of a fishing rod. The base member has a front surface and a rear surface for positioning against the thigh of the wearer. The first mounting strap extends from the base member. The first mounting strap is designed to releasably encircle the thigh of the wearer. The rod holder receives the end of the fishing rod. The rod holder is pivotally mounted to the base member for adjusting an angle between the fishing rod received in the rod holder and the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the. U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new body support harness for a fishing rod apparatus which has many of the advantages of the fishing rod devices mentioned heretofore and many novel features that result in a new body support harness for a fishing rod which is not anticipated, rendered obvious, suggested, or even implied by any of the prior art fishing rod devices, either alone or in any combination thereof.

It is another object of the present invention to provide a new body support harness for a fishing rod, which may be easily and efficiently manufactured and marketed.

It is a further object of the present invention to provide a new body support harness for a fishing rod, which is of a durable and reliable construction.

An even further object of the present invention is to provide a new body support harness for a fishing rod which is susceptible of a low cost of manufacture with regard to both materials and labor, and which accordingly is then susceptible of low prices of sale to the consuming public, thereby making such body support harness for a fishing rod economically available to the buying public.

Still yet another object of the present invention is to provide a new body support harness for a fishing rod which provides in the apparatuses and methods of the prior art some of the advantages thereof, while simultaneously overcoming some of the disadvantages normally associated therewith.

Still another object of the present invention is to provide a new body support harness for a fishing rod for supporting an end tip of a fishing rod on a thigh of a wearer.

Yet another object of the present invention is to provide a new body support harness for a fishing rod which includes a base member for positioning adjacent to a thigh of a wearer, a first mounting strap for mounting the base member to the thigh of the wearer, and a rod holder for receiving the end of a fishing rod. The base member has a front surface and a rear surface for positioning against the thigh of the wearer. The first mounting strap extends from the base member. The first mounting strap is designed to releasably encircle the thigh of the wearer. The rod holder receives the end of the fishing rod. The rod holder is pivotally mounted to the base member for adjusting an angle between the fishing rod received in the rod holder and the base member.

Still yet another object of the present invention is to provide a new body support harness for a fishing rod that permits a user to balance the rod on the user's thigh for better balance and strength while pulling and fighting a fish while fishing.

Even still another object of the present invention is to provide a new body support harness for a fishing rod that keeps the rod on the side of the leg, preventing the fishing pole from digging into a wearer's thigh.

Even still another object of the present invention is to provide a new body support harness for a fishing rod that allows a wearer to easily release the harness using the multiple hook and loop fasteners on the waistband and straps if an emergency or dangerous situation arises.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic back view of the present invention.

FIG. 3 is a schematic side view of the present invention.

FIG. 4 is a schematic exploded bottom view of the present invention.

DESCRIPTION OF THE PREFERRED EMBODIMENT

Figure 1:
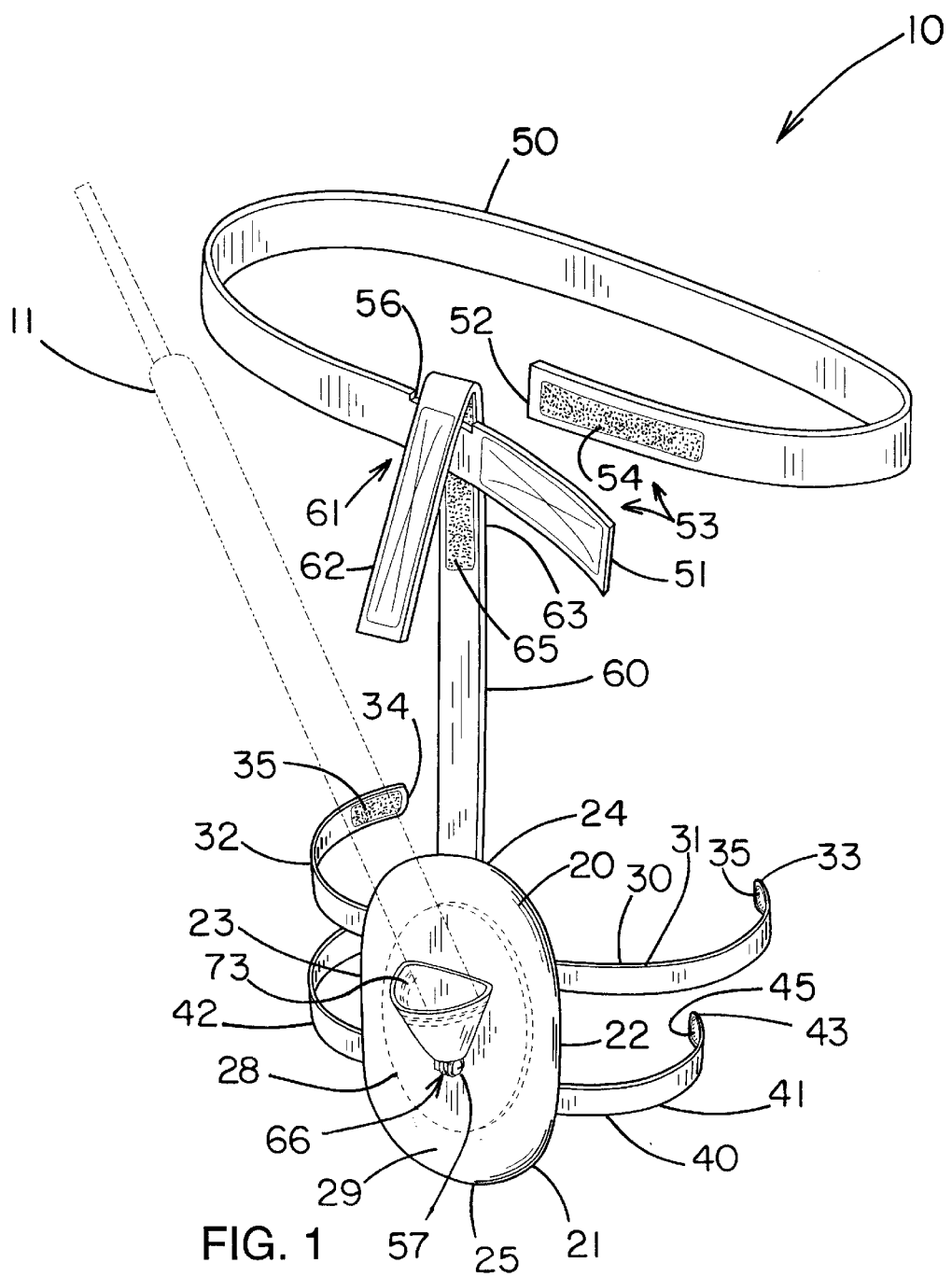
FIG. 1 is a schematic perspective view of a new body support harness for a fishing rod according to the present invention.

With reference now to the drawings, and in particular to FIGS. 1 through 4 thereof, a new body support harness for a fishing rod embodying the principles and concepts of the present invention and generally designated by the reference numeral 10 will be described.

As best illustrated in FIGS. 1 through 4, the body support harness for a fishing rod 10 generally comprises a base member 20 for positioning adjacent to a thigh of a wearer, a first mounting strap 30 for mounting the base member 20 to the thigh of the wearer, and a rod holder 70 for receiving the end of a fishing rod 11.

The base member 20 is elongate with a longitudinal axis and a lateral direction perpendicular to the longitudinal axis. The base member 20 has a perimeter 21, and in one embodiment has a substantially oblong shape. The base member 20 includes a pair of side edges 22, 23 and first 24 and second 25 end edges. The end edges 24, 25 may be substantially arcuate in shape.

Preferably, the base member 20 comprises a leather material. The base member 20 may be approximately six inches in width between each of the pair of side edges. In one embodiment of the invention, the base member 20 measures approximately ten inches in length between the first 24 and second 25 end edges.

In one embodiment of the invention, the base member 20 includes a front 26 and a back 27 portion. Preferably, an insert member 28 is located in between the front 26 and back 27 portions. Ideally, the insert member 28 is substantially identical in shape to the base member 20. The insert member 28 may be approximately two-thirds the size of the base member 20. Preferably, the insert member 28 comprises a plastic material that is approximately ¼ inch in thickness.

A first mounting strap 30 is provided for mounting the base member 20 to the thigh of the wearer. The first mounting strap 30 extends from the base member 20 in a lateral direction with respect to the base member 20. The first mounting strap 30 comprises a pair of first sections 31 and 32.

Each of the first sections 31, 32 extends from each one of the side edges 22, 23 of the base member 20 in opposite lateral directions. Each of the first sections 31, 32 includes free ends 33, 34. Each of the free ends 33, 34 of each of the first sections 31, 32 includes a component 35, 36 of a hook and loop fastener for releasably fastening the free ends 33, 34 together.

A second mounting strap 40 may be provided for mounting the base member 20 to the thigh of the wearer. The second mounting strap 40 extends from the base member 20 in an orientation below the first mounting strap 30. The second mounting strap 40 extends in a lateral direction with respect to the base member 20.

The second mounting strap 40 comprises a pair of second sections 41, 42. Each of the second sections 41, 42 extends from each one of the side edges 22, 23 of the base member 20 in opposite lateral directions. Each of the second sections 41, 42 includes free ends 43, 44. Each of the free ends. 43, 44 of each of the second sections includes a component 45, 46 of a hook and loop fastener for releasably fastening the free ends 43, 44 together.

In one embodiment of the invention, the first mounting strap 30 may be approximately 22 inches in length for comfortably securing to the thigh of the wearer. Preferably, the second mounting strap 40 may be approximately 15 inches in length for comfortably securing to the thigh of the wearer.

A waistband 50 may be provided for encircling a waist of the wearer. The waistband 50 includes opposite end portions 51, 52. Each of the end portions 51, 52 preferably includes a fastening structure 53 mounted thereon for releasably mounting the end portions 51, 52 together. In one embodiment, a first one 51 of the end portions includes a first hook and loop fastener component 54 mounted thereon. A second one 52 of the end portions includes a second hook and loop fastener component 55 mounted thereon. Preferably, the waistband 50 may be approximately 2 inches in width.

A linking strap 60 links the base member 20 to the waistband 50 to support the base member 20 in a vertical direction. The linking strap 60 is mounted on the base member 20. The linking strap 60 is designed to form a loop 61 for looping about the waistband 50. The linking strap 60 may extend for approximately 8 inches above one of the end edges 24 of the base member 20.

A free end 62 of the strap 60 is designed for releasably coupling to a portion 63 of the linking strap 60 for forming the loop 61. The free end 62 includes a component 64 of a hook and loop fastener. The component 64 of a hook and loop fastener is adapted for releasably securing to a component 65 of a hook and loop fastener on the portion 63 of the linking strap 60. Ideally, the free end 62 of the strap 60 measures approximately 6 inches in length.

A rod holder 70 receives the end of the fishing rod 11. A bottom portion 71 of the rod holder 70 is pivotally mounted to the base member 20. A top 72 of the rod holder 70 is movable away from a front surface 29 of the base member 20 for adjusting an angle between the fishing rod 11 and the base member 20. The rod holder 70 includes an upper opening 73 and a bottom 74.

The rod holder 70 includes a perimeter wall 75. The perimeter wall 75 is designed for extending between the upper opening 73 and the bottom 74. The perimeter wall 75 converges toward the bottom 74. A back 76 of the perimeter wall 75 may be substantially planar or flat to fit more closely against the front surface 29 of the base member 20, such as to form a more compact shape during storage.

In one embodiment of the invention, the upper opening 73 is approximately 3 inches in diameter. A lining 77 of a rubber-like non-slip material may be coupled to an inner surface 79 of the perimeter wall 75. This lining 77 may be approximately ⅛ to ¼ inch in thickness.

In one embodiment of the invention, an insert 78 may be located parallel to the back 76 of the perimeter wall 75. The insert 78 may comprise a plastic material. The plastic material may be approximately ⅛ to ¼ inch in thickness.

The insert 78 is secured to a pivotal mounting assembly 66. In one embodiment of the invention, the pivotal mounting assembly 66 comprises two arched members 67, 68 a loop member 69 for positioning in between the two arched members 67, 68 and a fastening assembly 48 for securing the arch 67, 68 and loop 69 members. The fastening assembly 48 may comprise a bolt 57, a washer 58, and a nut 59.

Preferably, the bottom 74 of the rod holder 70 is located approximately 3 inches from the second end edge 25 of the base member 20. The rod holder 70 may be positioned in the center of the base member 20.

The waistband 50 has a notch 56 for locating the linking strap 60 on the waistband 50. The notch 56 is formed in a portion of the waistband 50. Ideally, the notch 56 may be approximately ½ inch in width. The notch 56 may be positioned adjacent to one of the end portions 51, 52.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod body support harness for supporting an end tip of a fishing rod on a thigh of the wearer, the harness comprising:

a base member for positioning adjacent to a thigh of the wearer, the base member having a front surface and a rear surface for positioning against the thigh of the wearer, the base member being elongate with a longitudinal axis and a lateral direction perpendicular to the longitudinal axis, the base member having a perimeter with a substantially oblong shape, the base member having side edges and end edges, the end edges being substantially arcuate in shape;

an elongate first mounting strap for mounting the base member to the thigh of the wearer, the first mounting strap extending from the base member, the first mounting strap having a longitudinal axis, the first mounting strap extending in a lateral direction with respect to the base member, the first mounting strap comprising a pair of first sections, each of the first sections extending from one of the side edges of the base member in opposite lateral directions, each of the first sections having free ends, each of the free ends of the first sections having a component of a hook and loop fastener for releasably fastening the free ends together;

an elongate second mounting strap for mounting the base member to the thigh of the wearer, the second mounting strap extending from the base member in an orientation below the first mounting strap, the second mounting strap having a longitudinal axis, the second mounting strap extending in a lateral direction with respect to the base member, the second mounting strap comprising a pair of second sections, each of the second sections extending from one of the side edges of the base member in opposite lateral directions, each of the second sections having free ends, each of the free ends of the second sections having a component of a hook and loop fastener for releasably fastening the free ends together;

wherein the base member is elongate with a longitudinal axis and a lateral direction perpendicular to the longitudinal axis, the longitudinal axis of the base member being oriented substantially perpendicular to the longitudinal axis of the first and second mounting straps for orienting the longitudinal axis of the base member substantially parallel to the thigh of the wearer;

a waist band for encircling a waist of the wearer, the waist band having opposite end portions, each of the end portions having a fastening structure mounted thereon for releasably mounting the end portions together, a first one of the end portions having a first hook and loop fastener component mounted thereon and a second one of the end portions having a second hook and loop fastener component mounted thereon;

a linking strap for linking the base member to the waist band to support the base member in a vertical direction, the linking strap being mounted on the base member, the linking strap being adapted to form a loop for looping about the waist band, a free end of the strap being releasably couplable to a portion of the linking strap, for forming the loop, the free end having a component of a hook and loop fastener adapted for releasably securing to a component of a hook and loop fastener on the portion of the linking strap; and a rod holder for receiving the end of the fishing rod, the rod holder being pivotally mounted to the base member, a bottom of the rod holder being pivotally mounted to the base member such that a top of the rod holder is movable away from the front surface of the base member for adjusting an angle between the fishing rod and the base member, the rod holder having an upper opening and a bottom, the rod holder having a perimeter wall extending between the upper opening and the bottom, the perimeter wall converging toward the bottom;

wherein the waist band has a notch for locating the linking strap on the waist band, the notch being formed in a portion of the waist band, the notch being positioned adjacent to one of the end portions; and wherein the rod holder perimeter wall has a planar wall portion positioned toward the base member and a generally conical wall portion positioned away from the base member, the generally conical wall portion being mounted to said planar wall portion.

* * * * *